(12) United States Patent
Bourdelais et al.

(10) Patent No.: US 8,169,358 B1
(45) Date of Patent: May 1, 2012

(54) COHERENT MULTI-BAND RADAR AND COMMUNICATIONS TRANSCEIVER

(75) Inventors: John Michael Bourdelais, Vienna, VA (US); Ahmad Khalid Aman, Fairfax, VA (US)

(73) Assignee: BBN Technologies, Cambridge, MA (US)

( * ) Notice: Subject to any disclaimer, the term of this patent is extended or adjusted under 35 U.S.C. 154(b) by 1307 days.

(21) Appl. No.: 11/751,137

(22) Filed: Jun. 25, 2007

(51) Int. Cl.
*G01S 13/00* (2006.01)

(52) U.S. Cl. .............................. 342/52; 342/57; 342/192

(58) Field of Classification Search .................... 342/52, 342/57, 192
See application file for complete search history.

(56) References Cited

U.S. PATENT DOCUMENTS

| | | | |
|---|---|---|---|
| 5,945,940 A | 8/1999 | Cuomo | |
| 2002/0003488 A1* | 1/2002 | Levin et al. | 342/70 |
| 2003/0107511 A1* | 6/2003 | Stolarczyk et al. | 342/22 |
| 2005/0058092 A1* | 3/2005 | Suzuki | 370/320 |
| 2005/0094719 A1* | 5/2005 | Young | 375/222 |
| 2005/0185697 A1* | 8/2005 | Gargin | 375/130 |
| 2005/0272435 A1* | 12/2005 | Tsien et al. | 455/450 |
| 2006/0039449 A1* | 2/2006 | Fontana et al. | 375/130 |

* cited by examiner

*Primary Examiner* — Timothy A Brainard
(74) *Attorney, Agent, or Firm* — Kurt Rauschenbach; Rauschenbach Patent Law Group, LLP

(57) ABSTRACT

A multi-band RF transceiver for transmitting communications data and radar signals includes a transmitter having a source of communications data and radar signals. A modulator combines the data and radar signals and then modulates the combined signal with a carrier signal generated by a synthesizer. A processor instructs the synthesizer to change the carrier frequency and the source to provide data and radar signals corresponding to the carrier frequency so that multiple bands are transmitted over a desired spectrum. A receiver includes a demodulator that demodulates the received signal and a synthesizer that generates a signal that tunes the demodulator to the desired carrier frequency. A processor instructs the synthesizer to change the carrier frequency so that the demodulator demodulates the multiple bands of data and the radar signals over the desired spectrum.

30 Claims, 6 Drawing Sheets

COHERENT MULTI-BAND RADAR AND COMMUNICATIONS TRANSCEIVER

The section headings used herein are for organizational purposes only and should not to be construed as limiting the subject matter described in the present application.

BACKGROUND

The present invention relates to multi-band transmission and reception of two types of signals. There are many applications where it is desirable to combine multiple bands of different types of signals. For example, it is desirable for some applications to combine multiple Radio Frequency (RF) communications signals with radar pulses in a single transmission. Some aspects of the present invention relate to coherent multi-band RF transmission and reception. The terms "coherent multi-band transmission and "coherent multi-band reception" are defined herein as transmissions and receptions that create a wide band signal by coherently combining narrow band signals.

BRIEF DESCRIPTION OF THE DRAWINGS

The aspects of this invention may be better understood by referring to the following description in conjunction with the accompanying drawings, in which like numerals indicate like structural elements and features in various figures. The drawings are not necessarily to scale. The skilled artisan will understand that the drawings, described below, are for illustration purposes only. The drawings are not intended to limit the scope of the present teachings in any way.

DETAILED DESCRIPTION

Figure 1A:
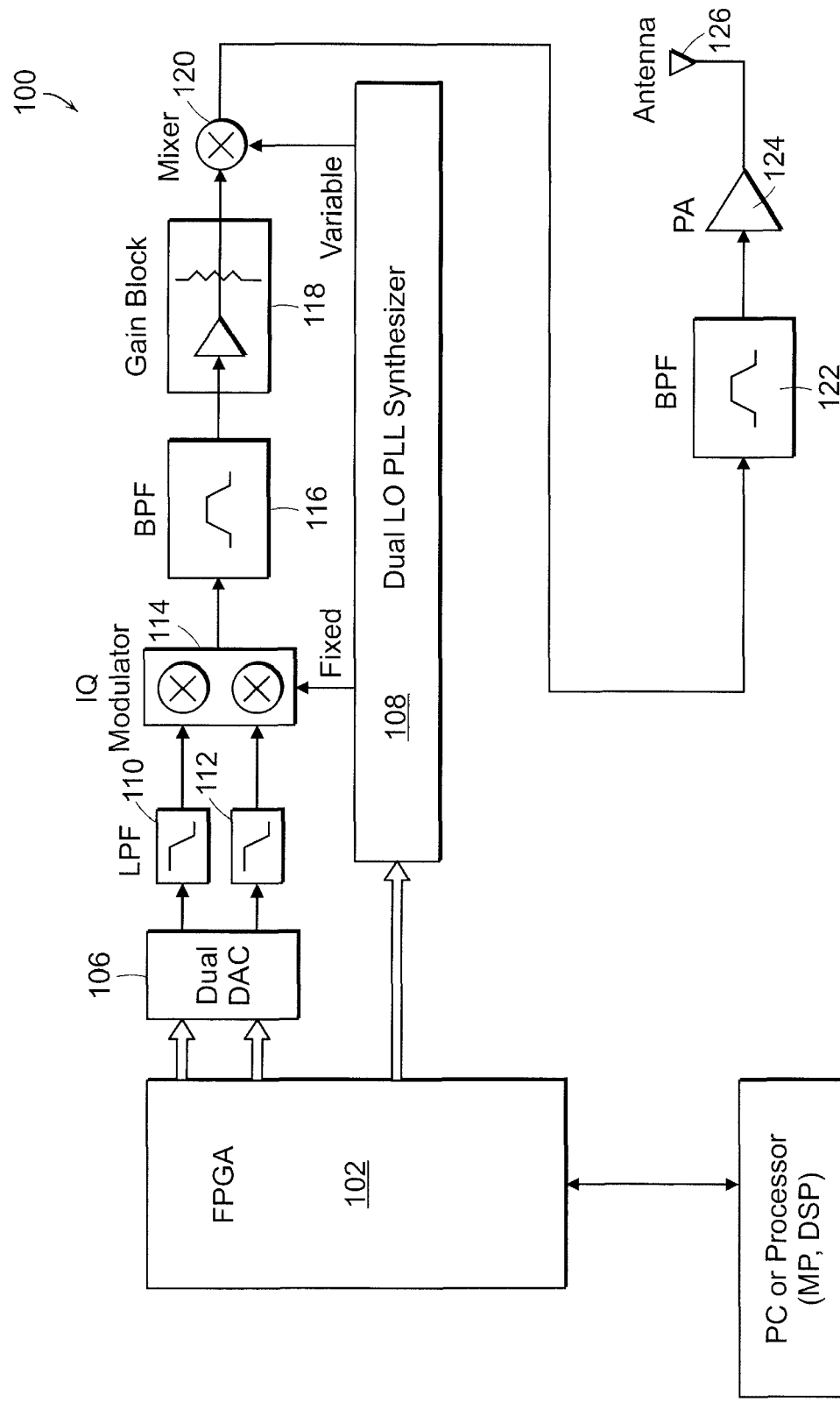
FIG. 1A illustrates one embodiment of a coherent multi-band radar and communications transmitter according to the present invention.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

For example, although aspects of the present invention are described in connection with transmitting communications data and radar pulses, it is understood that the methods and apparatus of the present invention can be applied to multi-band transmission of two or more of any type of signals. In addition, although aspects of the present invention are described in connection with apparatus and methods that sequentially transmit and receives pulses from various sub-bands, it is understood that the methods and apparatus of the present invention can be applied to systems that simultaneously transmit and receives pulses from various sub-bands.

It should be understood that the individual steps of the methods of the present invention may be performed in any order and/or simultaneously as long as the invention remains operable. Furthermore, it should be understood that the apparatus of the present invention can include any number or all of the described embodiments as long as the invention remains operable.

The range and spatial resolution of a radar system is determined by the carrier frequency and by the bandwidth of the radar signals. In relatively low resolution radar systems, the bandwidth of the RF pulses is a small fraction of the carrier frequency. In relatively high resolution or broadband radar systems, the bandwidth of the RF pulses is a higher fraction of the carrier frequency.

Traditional radar systems typically use a RF signal that has a single carrier frequency and fixed bandwidth pulses. To enhance the resolution in radar systems, ultra wide band (UWB) signals have been employed in place of gated continuous wave (CW) radar signals. Such enhanced radar systems typically have bandwidths that are on order of one to two GHz. However, the energy distribution of the radar signal is difficult to control. Therefore, UWB systems are limited in the power they can transmit due to interference with co-deployed systems.

The methods and apparatus of the present invention can coherently add narrow band radar signals to create GHz wide radar signals. For example, a coherent multi-band RF transceiver according to the present invention can coherently combine thirty-two 25 MHz bands to create an 800 MHz wide band signal. The resulting radar signals can be tailored to avoid sensitive frequencies in which communications or other radio frequency systems are employed. One feature of the coherent multi-band RF transceiver according to the present invention is that radar pulse shapes can be customized by utilizing contiguous or non-contiguous sub bands with equal or unequal spacing and/or equal or unequal bandwidths.

Thus, one aspect of the present invention relates to methods and apparatus for coherently combining multiple Radio Frequency (RF) bands for radar while maintaining RF radio communications capability in each of the multiple bands. In one embodiment, a coherent multi-band RF transceiver according to the present invention transmits and receives relatively narrowband RF pulses in multiple frequency bands one band at a time. In this embodiment, the coherent multi-band RF transceiver transmits and receives communications data concurrently with the radar pulses or in a separate transmission through sub-bands. In other embodiments, the coherent multi-band transceiver of the present invention transmits and receives pulses from some or all of the sub-bands simultaneously.

More specifically, a coherent multi-band RF transceiver according to the present invention digitizes multi-band data and then coherently combines the multi-band data using an algorithm that synthesizes a broadband response for monostatic and bistatic radar. The resulting response has the range resolution of the total spectrum transmitted. A coherent multi-band RF transceiver according to the present invention includes a transmitter and a receiver, which are relatively narrowband for particular transmissions but that span a broadband spectrum over time.

FIG. 1A illustrates one embodiment of a coherent multi-band radar and communications transmitter 100 according to the present invention. The transmitter 100 includes a Field Programmable Gate Array (FPGA) 102. In various embodiments, numerous other types of gate and logic arrays can be used instead of the FPGA. The FPGA 102 communicates with a processor 104 through a communications interface. The processor 104 provides commands and data and performs administrative functions, such as acknowledging receipt. In various embodiments, the processor 104 can be a PC, a dedicated processor, or a digital signal processor. The FPGA 102 provides the radar pulses and communications data. The FPGA 102 also generates signals that control the carrier frequency and the timing of the radar and data transmissions.

A radar pulse output of the FPGA 102 provides a digital representation of the desired radar pulses. A communications data output of the FPGA 102 provides a digital representation of the desired communications data. The communications data output and the radar pulse output of the FPGA 102 are electrically connected to respective inputs of a dual Digital-to-Analog Converter (DAC) 106. A data output of the DAC 106 generates a baseband analog representation of the communications data. A radar pulse output of the DAC 106 generates the analog radar pulses.

A control output of the FPGA 102 generates signals that control a local oscillator phase lock loop (PLL) synthesizer 108. The signal generated by the FPGA 102 set the frequency of signals generated by the PLL synthesizer 108. In the embodiment shown in FIG. 1, the PLL synthesizer 108 has a first and a second output that generate signals for IQ modulation and for mixing, respectively.

A first 110 and a second Low-Pass Filter (LPF) 112 are used to process the analog communications data and analog radar pulses to remove unwanted high frequency signals, such as high frequency noise. An input of the first LPF 110 is electrically connected to the data output of the DAC 106. An input of the second LPF 108 is electrically connected to the radar pulse output of the DAC 106. The low pass filters 110, 112 generate low pass filtered analog communications data and radar pulses at their respective outputs.

The outputs of the first and second LPFs 110, 112 are electrically connected to a respective one of the first and the second inputs of an IQ modulator 114. The first output of the PLL synthesizer 108 is electrically connected to a modulation input of the IQ modulator 114. The IQ modulator 114 modulates the low pass filtered analog communications data and radar pulses with the modulation signal generated by the PLL synthesizer 108 and generates an analog intermediate frequency (IF) signal. In various other embodiments, the filtered analog communications data and radar pulses can be modulated with a simple envelope signal or with numerous other modulation signals known in the art.

The output of the IQ modulator 114 is electrically connected to a band pass filter 116. The band pass filter 116 processes the analog IF signal to eliminate aliased digital noise from the IF signal. The output of the band pass filter 116 is electrically connected to the input of a gain block circuit 118. The gain block circuit 118 conditions and provides gain to the IF signal in order to generate a signal that is suitable for mixing.

The output of the gain block circuit 118 is electrically connected to a first input of the mixer 120. The second output of the PLL synthesizer 108 is electrically connected to the second input of the mixer 120. A mixer 120 mixes the amplified modulated communications and radar signal with the local oscillator signal generated by the PLL synthesizer 108 at the second output. The control signal generated by the FPGA 102 selects the frequency of the local oscillator. The frequency of the local oscillator is selected to adjust the frequency of the transmitted signal to the desired band. The mixer up converts the frequency of the modulated communications and radar signal to a desired RF carrier frequency, which is determined by the PLL synthesizer 108.

An output of the mixer 120 is electrically connected to an input of a bandpass filter 122. The bandpass filter 122 removes undesirable signal components from the frequency up converted modulated communications and radar signal that are generated during amplification and mixing and then generates a processed frequency up converted RF communications and radar signal at an output. For example, the bandpass filter 122 is typically designed to eliminate image signal components generated by the mixer 122.

The output of the bandpass filter 122 is electrically connected to an input of a power amplifier 124. The power amplifier 124 amplifies the desired communications and radar signal. The output of the power amplifier 124 is electrically connected to an antenna 126 that radiates the processed frequency up converted communications and radar signal.

Figure 1B:
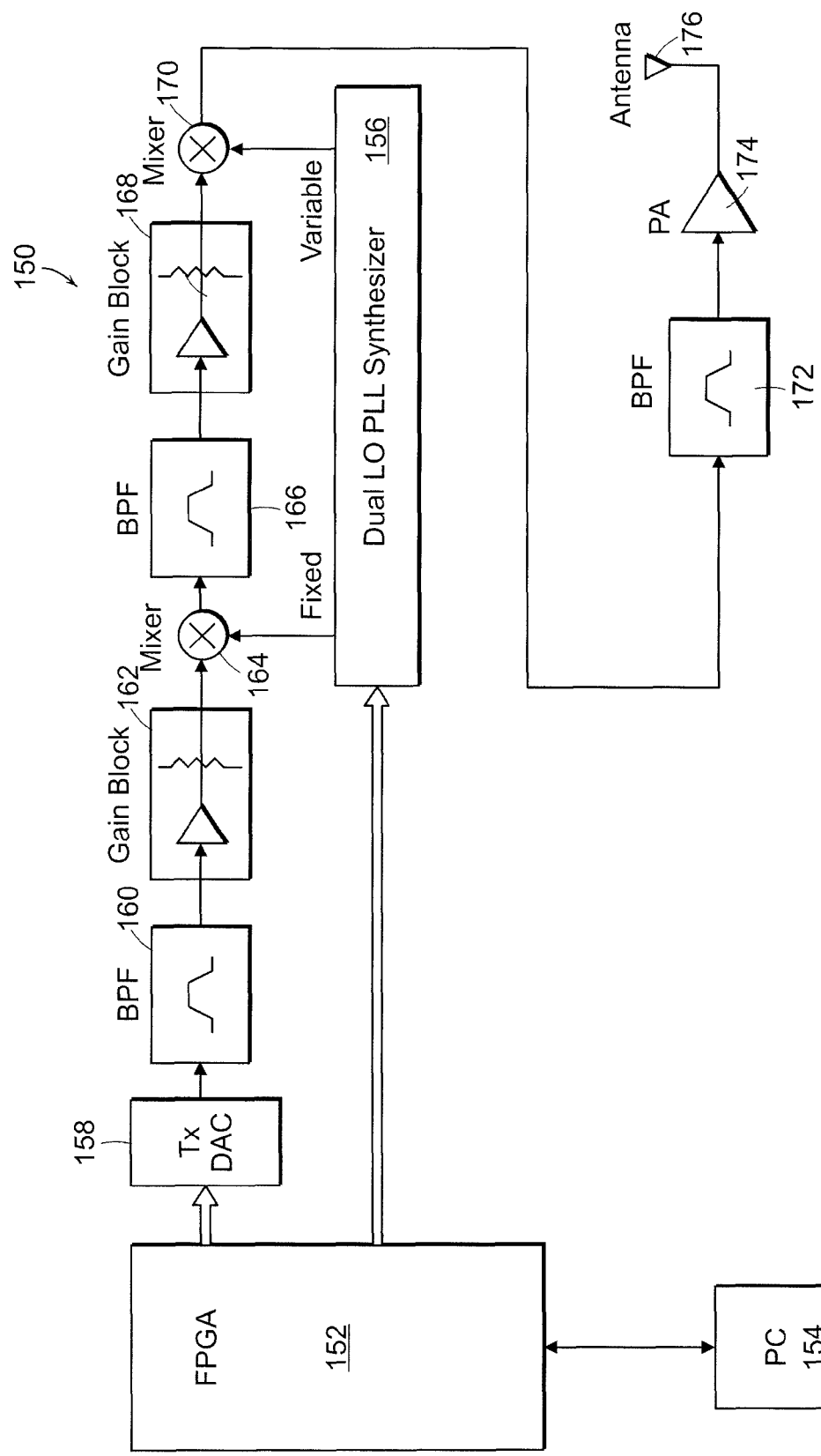
FIG. 1B illustrates another embodiment of a coherent multi-band radar and communications transmitter according to the present invention.

FIG. 1B illustrates another embodiment of a coherent multi-band radar and communications transmitter 150 according to the present invention. The transmitter 150 is similar to the transmitter 100 that was described in connection with FIG. 1A. However, the transmitter 150 does not include an IQ modulator. Instead, the transmitter 150 includes a digital-to-analog conversion circuit that converts digital baseband signals directly to an IF analog signal. Also, the transmitter includes an IF mixer that converts the IF frequency to a second IF frequency suitable for processing.

The transmitter 150 includes a FPGA 152. In various embodiments, numerous other types of gate and logic arrays can be used instead of the FPGA. The FPGA 152 communicates with a processor 154 through a communications interface. The processor 154 provides commands and data and performs administrative functions. In various embodiments, the processor 154 can be a PC, a dedicated processor, or a digital signal processor. The FPGA 152 provides the radar pulses and communications data. The FPGA 152 also generates signals that control the carrier frequency and the timing of the radar and data transmissions.

A control output of the FPGA 152 is connected to a control input the PLL synthesizer 156. The control signal generated by the FPGA 102 at the control output select the frequency of the local oscillators used with the IF and RF mixers.

A radar pulse and data output of the FPGA 152 is connected to a digital-to-analog converter (DAC) 158. In one embodiment, the DAC 158 includes digital interpolation filters and a digital modulator that converts a digital baseband signal directly to an analog modulated communications and radar signal at an intermediate frequency. An output of the DAC 158 is electrically connected to an input of a bandpass filter 160. The bandpass 160 processes the modulated communications and radar signal to remove unwanted signal components generated during the digital-to-analog conversion.

The output of the bandpass filter 160 is electrically connected to a gain block circuit 162. The gain block circuit 162 conditions and provides gain to the modulated communications and radar signal in order to generate a signal that is suitable for mixing.

The output of the gain block circuit 162 is electrically connected to a first input of an IF mixer 164. The second input of the IF mixer 164 is electrically connected to the first output of the PLL synthesizer 156. The IF mixer 164 converts the filtered modulated communications and radar signal to a second intermediate frequency. In some embodiments, the frequency of the signal generated by the first output of the PLL synthesizer 156 is fixed so that the second intermediate frequency is fixed.

The output of the IF mixer is electrically connected to a second bandpass filter 166. The second bandpass filter 166 processes the converted modulated communications and radar signal to remove unwanted signal components generated during mixing. An output of the second bandpass filter 166 is electrically connected to an input of the second gain block 168. The second gain block 168 amplifies the filtered converted modulated communications and radar signal.

An output of the second gain block 168 is electrically connected to a first input of the RF mixer 170. The second output of the PLL synthesizer 156 is electrically connected to the second input of the RF mixer 170. The RF mixer 170 mixes the modulated communications and radar signal at the second intermediate frequency with the local oscillator signal generated by the PLL synthesizer 156 at the second output. The control signal generated by the FPGA 152 selects the frequency of the local oscillator. The frequency of the local oscillator is selected to adjust the frequency of transmitted signal to the desired band. The RF mixer 170 up converts the frequency of the modulated communications and radar signal to a desired RF carrier frequency, which is determined by the PLL synthesizer 156.

An output of the RF mixer 170 is electrically connected to an input of a third bandpass filter 172. The third bandpass filter 172 removes undesirable signal components from the frequency up converted modulated communications and radar signal that are generated during amplification and mixing and then generates a processed frequency up converted RF communications and radar signal at an output. For example, the third bandpass filter 172 is typically designed to eliminate image signal components generated by the RF mixer 170.

The output of the third bandpass filter 172 is electrically connected to an input of a power amplifier 174. The power amplifier 174 amplifies the desired communications and radar signal. The output of the power amplifier 174 is electrically connected to an antenna 176 that radiates the processed frequency up converted communications and radar signal.

The operation of the transmitters 100, 150 is similar. The analog radar signals and communications data can be provided to the FPGA 102, 152 by the processor 104, 154. The analog radar signals and communications data comprise pulses that form a radar scan of digitized data sampled at the sampling rate of the digital-to-analog converter with a duration chosen so that the direct and returns for the desired maximum range are captured. For simple pulsed signaling, the maximum unambiguous range is equal to the inverse of the PRF (Pulse Repetition Frequency). Multiple pulses can be transmitted within a single band and coherently integrated to increase the signal-to-noise ratio.

The resulting analog radar signals and communications data can take many forms. For example, the analog radar signals and communications data can be pulses that are evenly spaced, with a constant Pulse Repetition Frequency (PRF). Alternately, the pulses can have a non-uniform but predetermined pattern of spacing between the pulses, such as with staggered or multiple PRF radars. The pulses can also have alternating signs on the baseband signal envelope in a Barker code sequence or maximal length sequence to remove range ambiguities.

Referring to the transmitter 100 described in connection with FIG. 1A, the digital-to-analog converter 106 in the transmitter 100 generates a baseband analog representation of the communications data and also generates analog radar pulses.

The bandpass filter 160 and the gain block 162 process the analog communications data and radar pulses.

The IQ modulator 114 modulates the processed analog communications data and radar pulses with the modulation signal generated by the PLL synthesizer 108 and generates an analog intermediate frequency (IF) signal. In some embodiments, the data is modulated by modulating the radar pulses in position (PPM) or in phase. In other embodiments, data is modulated using one of numerous other modulation schemes. For example, the analog signals can be modulated with a simple envelope signal or with a modulation signal, such as LFM (Linear Frequency Modulation), HFM (Hyperbolic Frequency modulation) or PRN (Pseudo-Random-Noise Sequence).

Alternatively, the digital-to-analog converter 158 in the transmitter 150 converts digital baseband signals directly to analog modulated communications and radar signals at the intermediate frequency. In various embodiments, numerous types of modulation formats that are known in the art can be used.

The bands used for communications can be dedicated bands that are used for communications only. In addition, the bands used for communications can be dynamic bands in that they can change over time depending upon the particular application. In one embodiment where un-modulated radar pulses are used for communications, a subset of pulses in each band is used to send a single bit of information. This effectively increases the communications bandwidth to one bit per pulse.

Also, in one embodiment, the modulated signals are pulse compressed using a digital matched filter. The digital matched filter can be specifically designed to compensate for the frequency difference between the local oscillators in the transmitter and the receiver. In one specific embodiment, the matched filters are implemented as a bank of hypothesized matched filters with a range of possible frequency offsets.

The modulated signal is then processed. The bandpass filters 116, 166 remove undesirable signal components, such as aliased digital noise from the IF signal caused by the IQ modulator 114 (FIG. 1A) and unwanted signal components generated during mixing in the IF mixer 164 (FIG. 1B). The gain blocks 118, 168 adjust the signal level of the modulated signals.

The mixers 120, 170 mix the amplified modulated communications and radar signal with the local oscillator signal generated by the PLL synthesizers 108, 156, respectively to form modulated radar signals and communications data at the carrier frequency that is suitable for transmission. The bandpass filters 122, 172 remove undesirable signal components generated during mixing. The power amplifiers 124 and 174 amplify the signal for transmission through the antennas 126, 176.

The transmitters 100, 150 transmit communications data in multiple bands by switching between carrier frequencies with the PLL synthesizers 108, 156. In some embodiments, only one band is transmitted at any given time. The frequency of the band is determined by the RF carrier frequency. In one embodiment, the transmitters 100, 150 change the frequency of the band monotonically (i.e. monotonically increases or decreases the frequency). In other embodiments, the transmitters 100, 150 change the frequency in a random way.

In one specific embodiment, the transmitters 100, 150 select carrier frequencies that are spaced at approximately the bandwidth of the radar pulse. In this embodiment, the sum of all the transmitted pulses will be approximately a continuous broadband spectrum. However, the bands do not need to be contiguous and it may be more desirable in some embodiments to skip certain frequency bands. For example, some frequency bands may contain unwanted interference. Some frequencies may also overlap with other bands, such as radar bands, so as to cause range ambiguities.

In one embodiment, the coherent multi-band RF transceiver of the present invention uses coherent pulse integration. Coherent pulse integration is commonly used in radar systems for increasing signal-to-noise ratio (SNR). Coherent pulse integration transmits multiple pulses per band in order to enhance the SNR within each sub-band. Coherent pulse integration requires compensation for the relative phase difference between transmit and receive oscillators when used with bistatic radar systems. Compensation for relative phase differences is only required for bistatic radar systems since monostatic radar systems use the same oscillators for the transmitter and receiver.

Figure 2A:
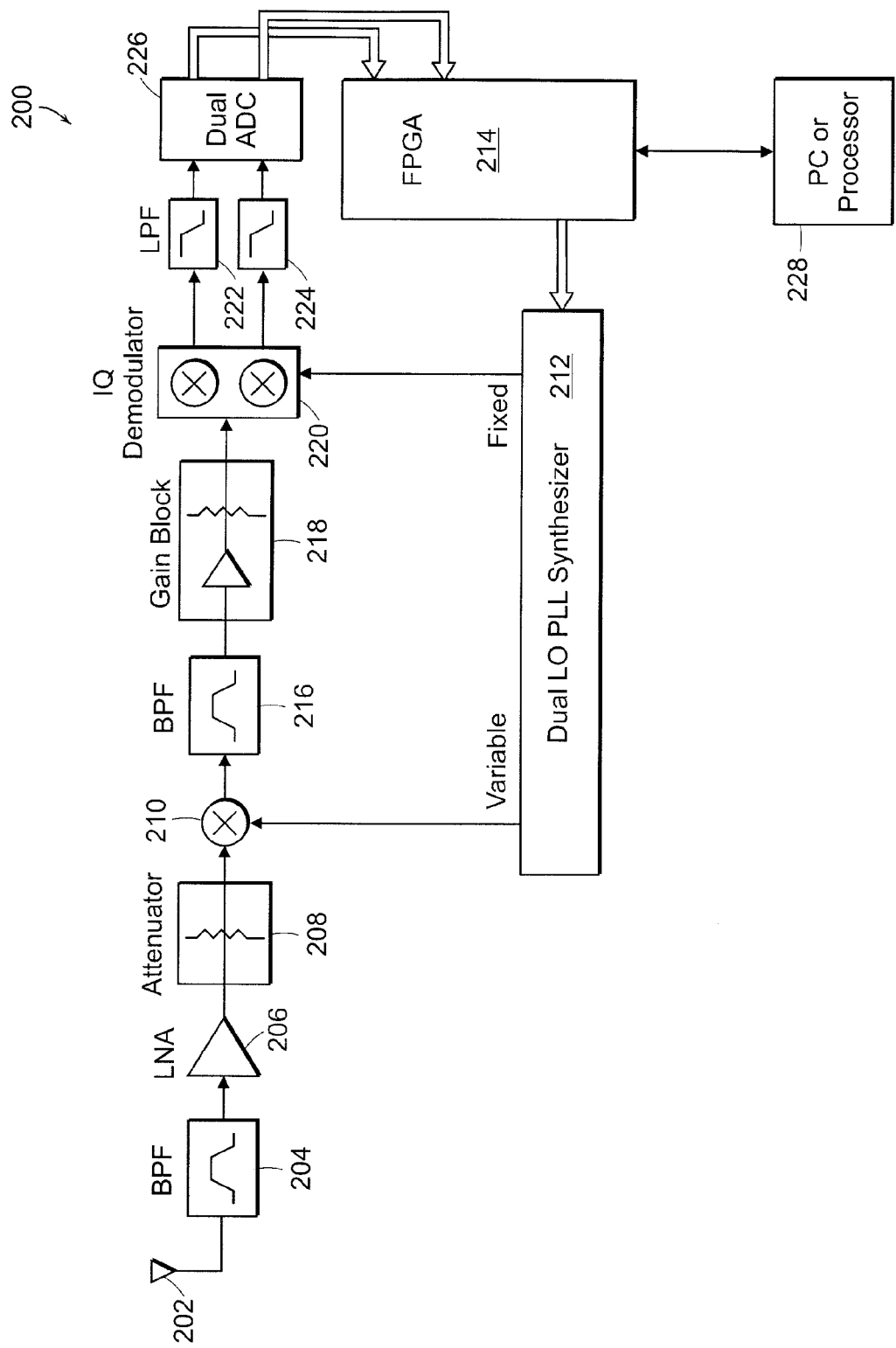
FIG. 2A illustrates one embodiment of a coherent multi-band radar and communications receiver according to the present invention that receives signals transmitted by the transmitter described in connection with FIG. 1A.

FIG. 2A illustrates one embodiment of a coherent multi-band radar and communications receiver 200 according to the present invention that receives signals transmitted by the transmitter 100 described in connection with FIG. 1A. The transmitter 100 and receiver 200 together form a bistatic radar system. The term "bistatic radar" refers to radar systems that have separate transmit and receive antennas, which can be located a significant distance apart (i.e. miles apart in some embodiments). In contrast, monostatic radar systems have the transmitter co-located with the receiver.

In one embodiment, a transceiver according to the present invention supports wireless communications between the transmitter and the receiver to synchronize the reception of signals with the transmission of the signals. For example, wireless communications can be used to synchronize the selection of carrier frequencies.

The receiver 200 includes a reception antenna 202 that receives the signals transmitted by the transmission antenna 126 (FIG. 1A). The output of the antenna 202 was electrically connected to an input of a first bandpass filter 204. The first bandpass filter 204 passes only the desired bandwidth of the signals receives by the antenna 202 to an output.

The output of the first bandpass filter 204 is electrically connected to an input of a low noise amplifier 206. The low noise amplifier 206 amplifies the received signals in the passband of the first bandpass filter 204 and generates an amplified signal at an output. The low noise amplifier 206 amplifies the received signals to a signal level that can be processed by standard electronics. The output of the low noise amplifier 206 is electrically connected to an input of an attenuator 208. The attenuator 208 limits the signal level of the received signal so that the received signal does not damage other components in the receiver 200.

An output of the attenuator 208 is electrically connected to a first input of a mixer 210. An output of a PLL synthesizer 212 is electrically connected to a second input of the mixer 210. The PLL synthesizer 212 includes a control input that is electrically connected to an output of a FPGA 214. The FPGA 214 instructs the PLL synthesizer 212 to generate a local oscillator signal having a frequency that when mixed with the received signal processed by the bandpass filter 204, low noise amplifier 206, and the attenuator 208 synchronizes the received signal in time and generates a signal at the desired intermediate frequency at the output of the mixer 210. The local oscillator signal generated by the PLL synthesizer 212 is variable so as to accommodate different receiver frequency bands. The PLL synthesizer 212 is designed to change the frequency of the local oscillator signal fast enough accommodate changes in frequency bands.

An input of a second bandpass filter 216 is electrically connected to the output of the mixer 210. The second bandpass filter 216 passes only the desired reception bandwidth at an output. An input of a gain block 218 is electrically connected to the output of the second bandpass filter 216. The gain block 218 amplifies the processed reception signal mixed with the local oscillator signal generated by the PLL synthesizer 212 to generate an amplified signal at an output with the desired signal level for demodulation.

The output of the gain block 218 is electrically connected to a first input of an IQ demodulator 220. A second output of the PLL synthesizer 212 is electrically connected to the second input of the IQ demodulator 220. In the embodiment shown in FIG. 2A, the PLL synthesizer 212 generates a fixed frequency local oscillator signal. The IQ demodulator 220 demodulates the received signal at the intermediate frequency and provides the received demodulated radar signals in the desired frequency band at a first output and the communications data in the desired frequency band at a second output.

The first output of the IQ demodulator is electrically connected to an input of a first 222 low pass filter 224. The second output of the IQ demodulator is electrically connected to an input of a second low pass filter 224. The first and second low pass filters 222, 224 remove undesirable high frequency components in the demodulated radar signals and communications data.

The outputs of the first and second low pass filters 222, 224 are electrically connected to respective inputs of a dual analog-to-digital converter 226. The dual analog-to-digital converter 226 converts the analog radar signals to corresponding digital radar signals at a first output. In addition, the dual analog-to-digital converter 226 converts the analog radar signals to corresponding digital radar signals at a second output. The first and second output of the dual analog-to-digital converter 226 is electrically connected to a first and a second data input of the FPGA 214.

A processor 228 or other computing device is electrically connected to a communications interface of the FPGA 214. The processor 228 receives the digital communications data and radar pulses and processes the digital communications data and/or radar pulses for various applications. In some embodiments, the processor 228 processes the digital communications data and/or radar pulses to compensate for relative phase differences across the pulses that are caused by differences in local oscillator frequencies in the transmitter 100 and in the receiver 200.

In one specific embodiment, the processor 228 is used to measure the phase of a common time reference directly from the received signal arrivals. The computer 228 performs Fast Fourier Transform (FFT) based estimation calculations or performs other phase tracking calculations to measure the phase progression across received pulse. The phase of the common time references can also be estimated by calculating the maximum eigenvector of the covariance matrix estimate that is obtained from the cross-correlation of the sub-bands taken across all or part of the scans. The phase progression across the received pulses is then compensated for across the sub-bands so that the common reference point has zero phase across all the sub-bands before further processing. One skilled in the art will understand that compensation for relative phase differences may not be necessary if local oscillators with precise control of frequencies are used.

Figure 2B:
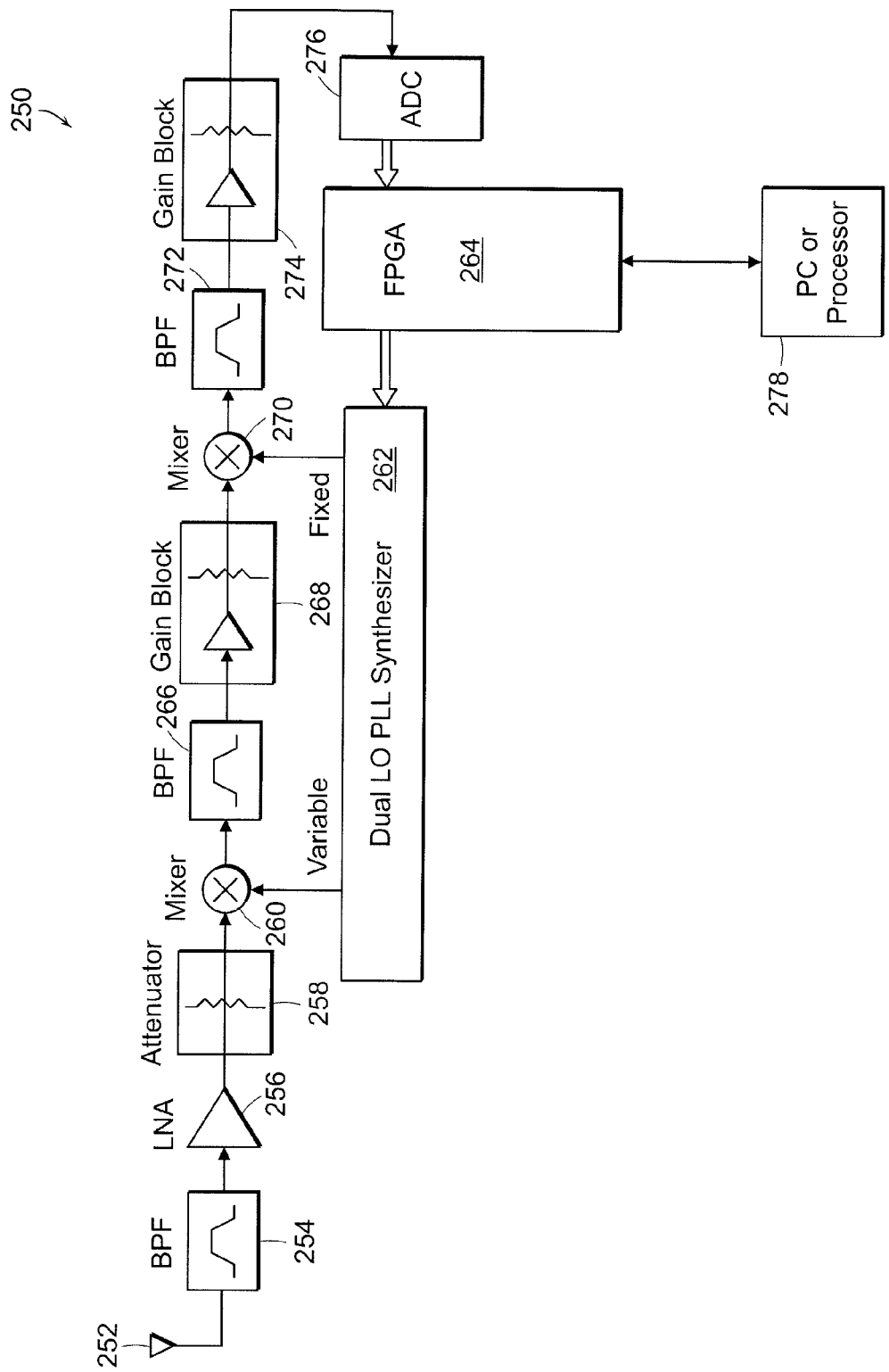
FIG. 2B illustrates another embodiment of a coherent multi-band radar and communications receiver according to the present invention that receives signals transmitted by the transmitter described in connection with FIG. 1B.

FIG. 2B illustrates another embodiment of a coherent multi-band radar and communications receiver 250 according to the present invention that receives signals transmitted by the transmitter 150 described in connection with FIG. 1B. The receiver 250 is similar to the receive 200 that was described in connection with FIG. 2A. However, the receiver 250 includes a RF mixer instead of the IQ demodulator 220. The transmitter 150 (FIG. 1B) and receiver 250 together form a bistatic radar system.

The receiver 250 includes a reception antenna 252 that receives the signals transmitted by the transmission antenna 176 (FIG. 1B). The output of the antenna 252 is electrically connected to an input of a first bandpass filter 254. The first bandpass filter 254 passes only the desired bandwidth of the signals receives by the antenna 252 to an output.

The output of the first bandpass filter 254 is electrically connected to an input of a low noise amplifier 256. The low noise amplifier 256 amplifies the received signals in the passband of the first bandpass filter 254 and generates an amplified signal at an output. The low noise amplifier 256 amplifies the received signals to a signal level that can be processed by standard electronics. The output of the low noise amplifier 256 is electrically connected to an input of an attenuator 258. The attenuator 258 limits the signal level of the received signal so that the received signal does not damage other components in the receiver 250.

An output of the attenuator 258 is electrically connected to a first input of a RF mixer 260. An output of a PLL synthesizer 262 is electrically connected to a second input of the RF mixer 260. The PLL synthesizer 262 includes a control input that is electrically connected to an output of a FPGA 264. The FPGA 264 instructs the PLL synthesizer 262 to generate a local oscillator signal having a frequency that when mixed with the received signal processed by the bandpass filter 254, low noise amplifier 256, and the attenuator 258 synchronizes the received signal in time and then generates a signal at the desired intermediate frequency at the output of the mixer 260. The local oscillator signal generated by the PLL synthesizer 262 is variable so as to accommodate different receiver frequency bands. The PLL synthesizer 262 is designed to change the frequency of the local oscillator signal fast enough accommodate changes in frequency bands.

An input of a second bandpass filter 266 is electrically connected to the output of the IF mixer 260. The second bandpass filter 266 passes only the desired reception bandwidth at an output. An input of a gain block 268 is electrically connected to the output of the second bandpass filter 266. The gain block 268 amplifies the processed reception signal mixed with the local oscillator signal generated by the PLL synthesizer 262 to generate an amplified signal at an output with the desired signal level for demodulation.

The output of the gain block 268 is electrically connected to a first input of a IF mixer 270. A second output of the PLL synthesizer 262 is electrically connected to the second input of the IF mixer 270. In the embodiment shown in FIG. 2B, the PLL synthesizer 262 generates a fixed frequency local oscillator signal. The IF mixer 270 mixes the received radar signal and communications data signal at the intermediate frequency with the fixed local oscillator frequency provided by the PLL synthesizer 262 to down convert the frequency of the received radar signal and communications data signal to a desired second intermediate frequency.

The output of the IF mixer 270 is electrically connected to an input of a third bandpass filter 272. The third bandpass filter 272 is used to remove the image frequencies generated during mixing. The output of the second bandpass filter 272 is electrically connected to an input of a second gain block 274. The second gain block 274 provides gain and conditions the received radar signals and communications data signals at the second intermediate frequency so that the signals can be accurately converted to a digital signal with an analog-to-digital converter 276.

The output of the gain block 274 is electrically connected to an input of the analog-to-digital converter 276. The analog-to-digital converter 276 converts the received radar signal and communications data signal at the second intermediate frequency to digital data signals. The analog-to-digital converter 276 can use intermediate frequency sub-sampling to extract the radar signal and communications data into the first Nyquist band.

The output of the analog-to-digital converter 276 is electrically connected to the FPGA 264. In the embodiment shown in FIG. 2B, the FPGA 264 demodulates the signals to complex base band signals. In some embodiments, the FPGA 264 also performs data interpolation of the radar signals and communication data to produce high resolution temporal data. Also, in some embodiments, the FPGA 264 performs phase and time alignment of the radar signals and communications data. In addition, in some embodiments, the FPGA 264 modulates the time aligned signal to the proper frequency band.

A processor 278 or other computing device is electrically connected to a communications interface of the FPGA 102. The processor 278 receives the demodulated digital radar signal and communications data and processes the radar signal and communications data for various applications. In some embodiments, the processor 276 processes the digital communications data and/or radar pulses to compensate for relative phase differences across the pulses that are caused by differences in local oscillator frequencies in the transmitter 150 and in the receiver 250.

In some embodiments, the processor 278 receives the time aligned radar signals and communications data from the FPGA 264 and coherently combines a plurality of bands to create a radar swath. The multiple radar swaths can be further processed by the processor 278 to detect, classify, locate, and track targets.

The operation of the receiver 200 (FIG. 2A) and the receiver 250 (FIG. 2B) is similar. The radar signals and communications data are received with the antennas 202, 252. The bandpass filters 204, 254 filter the desired signal band. The low noise amplifiers 206, 256 amplify the desired signal band. The attenuators 208, 258 adjust the amplitude of the signals in the desired signal band. In some embodiments, automatic gain control is employed to ensure that the amplitude of the received analog signal is in a range that is suitable for digitization.

The FPGAs 214, 264 instructs the PLL synthesizers 212, 262 to generate a local oscillator signal that when mixed with the received analog signal processed by the bandpass filters 204, 254, low noise amplifiers 206, 256 and the attenuators 208, 258 synchronizes the received signal in time and generate signals in the desired sub-bands. The PLL synthesizers 212, 262 provide relatively coarse control of synchronization and tuning of the received analog signal to the desired sub-band.

The FPGAs 214, 264 and the PLL synthesizers 212, 262 are designed and operated so that the FPGAs 214, 264 can generate signals and the PLL synthesizers 212, 262 can receive and process the received signals fast enough for the receivers 200, 250 to switch bands at the desired rate. For example, in some embodiments, the FPGAs 214, 264 and the PLL synthesizers 212, 262 are designed and operated so that multiple bands in the spectrum of interest can be received and processed in time periods where the sampled environment is stable.

The second bandpass filter 216 passes only the desired reception bandwidths at an output. The gain block 218 amplifies the processed reception signals mixed with the local oscillator signal generated by the PLL synthesizer 212 to generate amplified signals with the desired signal levels for demodulation.

Referring to FIG. 2A, the IQ demodulator 220 demodulates or basebands the amplified reception signal in the desired band and extracts the received radar signals and communications data. Referring to FIG. 2B, the IF mixer 270 mixes the received radar signal and communications data signal at the intermediate frequency with the fixed local oscillator frequency provided by the PLL synthesizer 262 to down convert the frequency of the received radar signal and communications data signal to a desired second intermediate frequency.

In some embodiments, the demodulated radar and communications signals are time aligned to a common reference point across the various bands. For monostatic radars, the data is already time aligned because the transmitter and receiver are co-located. However, for bistatic radars, time alignment may be needed. If the analog-to-digital converters are clocked accurately and a precise transmission and receive schedule is followed, then the arrival times of the signals should be in the same place in each sub-band radar scan and no time alignment will typically be needed. However, if the analog-to-digital converters are not accurately clocked, the time of arrival must be estimated from the data using a sub-sample time of arrival estimator. The data must then be shifted in time so each sub-band has the estimated arrival time at a common sample across all the scans.

Referring to FIG. 2A, the first and second low pass filters 222, 224 remove undesirable high frequency components in the demodulated radar signals and communications data. The dual analog-to-digital converter 226 converts the analog radar signals and the analog communications data to corresponding digital radar signals and digital communications signals and then sends these digital signals to the FPGA 214.

Referring to FIG. 2B, the second bandpass filter 272 removes the image frequencies generated during mixing. The second gain block 274 provides gain and conditions the received radar signals and communications data signal at the second intermediate frequency so that the signals can be accurately converted to a digital signal with the analog-to-digital converter 276.

In one embodiment, the receivers 100, 150 perform coherent band combination. In this embodiment, digitized data from each pulse-integrated or pulse compressed band is interpolated to an output sample rate that provides an exact reconstruction of the total spectrum spanned by all the bands. In many embodiments, the output sample rate is a sample rate that is at the Nyquist sampling rate or higher. The Nyquist sampling rate is a rate that is twice the signal bandwidth. Sampling at the Nyquist rate or higher will allow an exact reconstruction of the total spectrum. For example, if the number of contiguous bands is 16 then the sub-band data is interpolated 16:1 or more.

In one embodiment, the modulated sub-bands are re-modulated by the frequency difference between the center of the total spectrum and the center frequency of each sub-band. A common reference point is used as a zero time delay reference for generating the re-modulation vectors. Re-modulated data from all the bands is then summed to produce a broadband output scan of data. Band recombination can, however, effect pulse compression.

In other embodiments, the coherent multi-band transceiver of the present invention transmits and receives pulses from all the sub-bands simultaneously. Simultaneous transmission and reception of pulses increases the scan rate and the communications bandwidth of the RF transceiver. In this embodiment, separate receivers are required for each sub-band that includes separate demodulators and A/D circuits.

Figure 3:
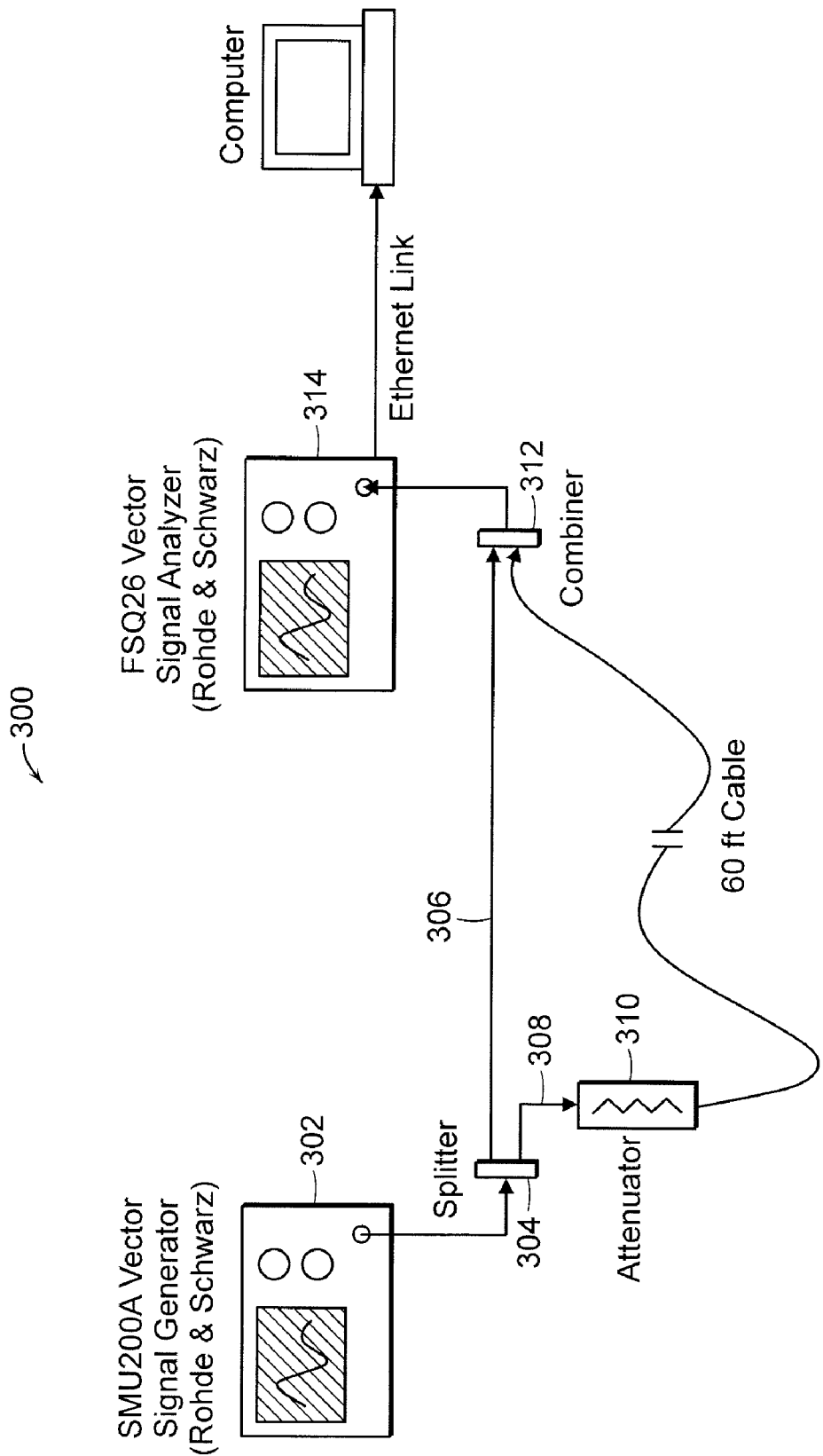
FIG. 3 illustrates a block diagram of a transceiver used to experimental demonstrate coherent band recombination according to the present invention.

FIG. 3 illustrates a block diagram of a transceiver 300 used to experimentally demonstrate coherent band recombination according to the present invention. A transmitter 302 is used to generate multiple bands of RF pulses. In the embodiment shown in FIG. 3, the transmitter 302 is a vector signal generator. In the experiment described herein, the transmitter 302 is a Rohde and Schwarz SMU200A vector signal generator that generates a transmission signal having 16 bands of RF pulses with 1,000 pulses per band at a PRF of 0.5 MHz.

A simulated target path was created by introducing a splitter 304 proximate to the transmitter 302. The splitter 304 splits the transmission signal generated by the transmitter 302 into a direct transmission line 306 and a delayed transmission line 308. In the experiment described herein, the direct transmission line 306 is a short transmission line that is less than one meter long and the delayed transmission line 308 is approximately a 13 meter transmission line. An attenuator 310 is used to control the amplitude of the signal propagating in the delayed transmission line to simulate the attenuation experienced by a target reflection.

A first input of a combiner 312 is electrically connected to the output of the direct transmission line 306. A second input of the combiner 312 is electrically connected to the delayed transmission line 308. The combiner 312 combines the direct and the delayed transmission signals at a physical location that is proximate to a signal analyzer 314. In the particular experiment described herein, the signal analyzer 314 was a Rohde and Schwarz FSQ-26 vector signal analyzer.

The additional cable length in the delayed transmission line 308 produces an artificial target with an electronic delay that is proportional to the difference in the cable lengths along the direct transmission line 306 and the delayed transmission line 308. Thus, the delay provided by the additional cable length in the delayed transmission line 308 and the attenuation provided by the attenuator 310 simulate a radar target reflection with an appropriate delay and attenuation.

Figure 4:
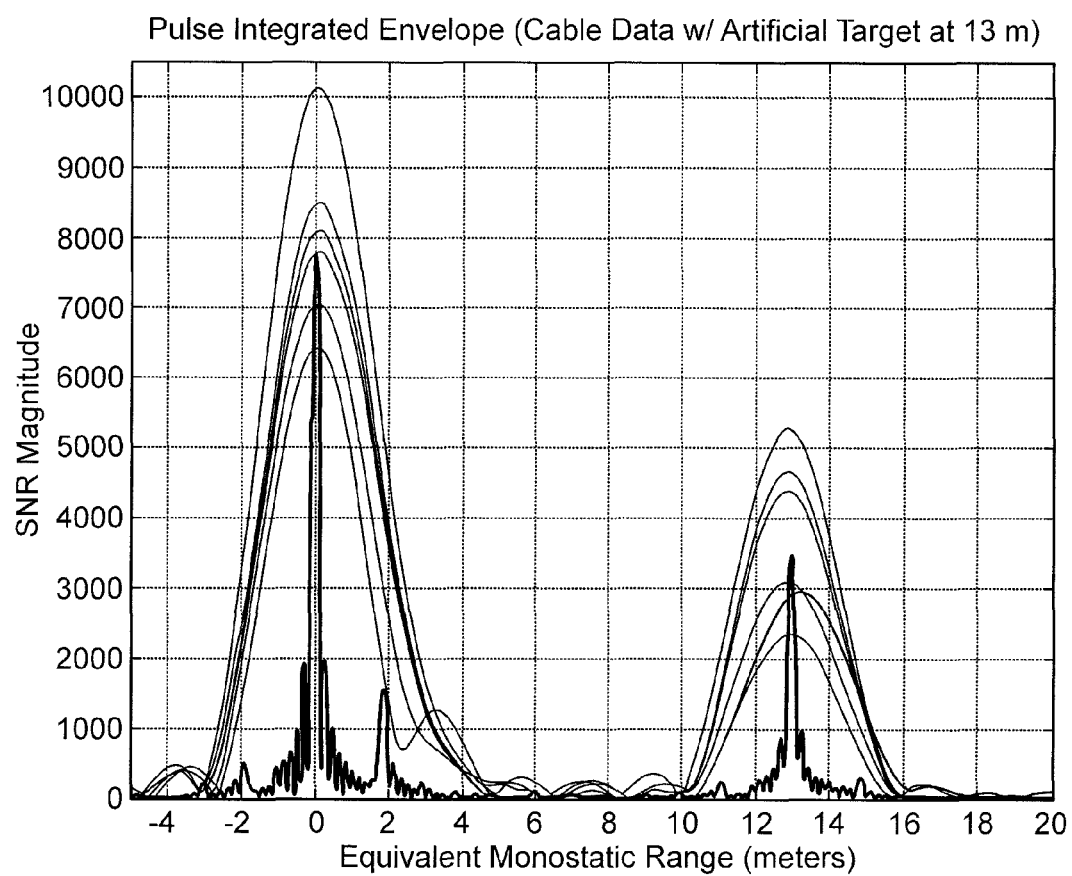
FIG. 4 illustrates experimental results taken with the transceiver described in connection with FIG. 3.

FIG. 4 illustrates experimental pulse integration data 400 taken with the transceiver 300 described in connection with FIG. 3. The pulse integration experimental data 400 were obtained by manually switching the frequency of the transmitter 302 between 16 successive bands that are spaced 50 MHz apart over a span of 15 minutes. The delayed transmission line was 13 meters long and the attenuator 310 attenuated the signal in the delayed transmission line by about 6 dB.

The pulse integration data 400 is presented in a graph of the magnitude of the signal-to-noise ratio of the received signal as a function of range. The results demonstrate that coherent band recombination is achieved. The data 400 shows two pronounced peaks a zero range and a range of 13 meters as expected.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention as defined by the appended claims.

What is claimed is:

1. A coherent multi-band RF transceiver for transmitting communications data and radar signals, the transceiver comprising:

a) a transmitter comprising:
  i. a source of communications data and radar signals;
  ii. a modulator that is electrically connected to the source, the modulator modulating the communications data and radar signals with a carrier signal;
  iii. a synthesizer having an output that is electrically connected to a modulation input of the modulator, the synthesizer generating the carrier signal; and
  iv. a logic device that is electrically connected to a control input of the synthesizer and to a control input of the source, the logic device instructing the synthesizer to change the carrier frequency sequentially in time and instructing the source to provide communications data and radar signals corresponding to the changing carrier frequency so that multiple bands of communications data and radar signals are transmitted over a desired spectrum; and
b) a receiver comprising:
  i. a demodulator that demodulates a received signal transmitted by the transmitter;
  ii. a synthesizer that is electrically connected to a control input of the demodulator, the synthesizer generating a signal that tunes the demodulator to a desired carrier frequency; and
  iii. a logic device that is electrically connected to a control input of the synthesizer, the logic device instructing the synthesizer to change the carrier frequency sequentially in time so that the demodulator demodulates the multiple bands of communications data and the radar signals over the desired spectrum.

2. The transceiver of claim 1 wherein the modulator modulates the combined signal with the carrier signal using IQ modulation.

3. The transceiver of claim 1 wherein the modulator comprise a digital modulator that converts a digital baseband signal directly to analog modulated communications and radar signals.

4. The transceiver of claim 1 wherein at least one of the synthesizer in the transmitter and the synthesizer in the receiver comprises a PLL synthesizer.

5. The transceiver of claim 1 wherein the logic device in the receiver is synchronized to the logic device in the transmitter.

6. The transceiver of claim 1 wherein the logic device in at least one of the transmitter and the receiver comprises a field programmable gate array.

7. The transceiver of claim 1 wherein the logic device in at least one of the transmitter and the receiver instructs the synthesizer to monotonically change the carrier frequency.

8. The transceiver of claim 1 wherein the logic device in at least one of the transmitter and the receiver instructs the synthesizer to randomly change the carrier frequency.

9. The transceiver of claim 1 wherein the signal generated by the synthesizer in the receiver is substantially synchronized to the signal generated by the synthesizer in the transmitter.

10. The transceiver of claim 1 further comprising a processor that is coupled to at least one of the transmitter logic device and the receiver logic device.

11. The transceiver of claim 10 wherein the processor dynamically changes the carrier frequency.

12. The transceiver of claim 1 wherein the source further comprises an analog-to-digital converter that converts a baseband digital pulse stream to the communications data.

13. The transceiver of claim 1 wherein the receiver further comprises an analog-to-digital converter that converts the demodulated multiple bands of communications data and radar signals to a digital signal.

14. The transceiver of claim 1 wherein the transmitter further comprises a digital matched filter that compresses the modulated combined signal to compensate for difference in timing between the modulator and demodulator.

15. The transceiver of claim 1 wherein the synthesizer in the receiver generates the signal that tunes the demodulator to the desired carrier frequency and the logic device in the receiver instructs the synthesizer in the receiver to change the carrier frequency sequentially in time during a time period where a sampling environment is relatively stable.

16. A method of coherent multi-band RF data communications and radar processing, the method comprising:
  a) providing communications data and radar signals;
  b) generating a plurality of carrier signals, each of the plurality of carrier signals having a frequency corresponding to predetermined sequences of the communications data and radar signals;
  c) modulating the predetermined sequences of the communications data and radar signals with their corresponding predetermined carrier signal so that multiple bands of communications data and radar signals are transmitted over a desired spectrum; and
  d) receiving and demodulating the multiple bands of communications data and radar signals over the desired spectrum, each of the predetermined sequences of the communications data and radar signals being demodulated with their predetermined carrier frequency sequentially in time.

17. The method of claim 16 wherein each of the plurality of carrier signals is spaced at approximately a bandwidth of the radar signals.

18. The method of claim 16 wherein the modulating the predetermined sequences of the communications data and radar signals comprises IQ modulation.

19. The method of claim 16 wherein the modulating the predetermined sequences of the communications data and radar signals comprises direct digital modulation.

20. The method of claim 16 wherein the frequency of the plurality of carrier signals monotonically changes.

21. The method of claim 16 wherein the frequency of the plurality of carrier signals randomly changes.

22. The method of claim 16 wherein the modulating the predetermined sequences of the communications data and radar signals is synchronized to the demodulating the multiple bands of communications data and radar signals.

23. The method of claim 16 further comprising dynamically changing the carrier frequency for a particular application.

24. The method of claim 16 further comprising converting baseband digital communication data to the communications data.

25. The method of claim 16 further comprising compressing the modulated signals to compensate for a difference in timing between the modulation and the demodulation.

26. The method of claim 16 wherein the modulating the communications data comprises modulating the radar signal in position.

27. The method of claim 16 wherein the modulating the communications data comprises modulating the radar signal in phase.

28. The method of claim 16 further comprising performing coherent pulse integration by modulating multiple pulses.

29. The method of claim 16 further comprising re-modulating the communications data and radar signals and then summing the re-modulated signal.

30. A coherent multi-band RF transceiver for transmitting communications data and radar signals, the transceiver comprising:
- a) a means for generating a plurality of carrier signals corresponding to predetermined bands of communications data and radar signals over a desired spectrum;
- b) a means for modulating the communications data and radar signals with the plurality of carrier signals;
- c) a means for generating a plurality of local oscillator signals for demodulating the modulated communications data and radar signals over the desired spectrum; and
- d) a means for receiving and demodulating the modulated communications data and radar signals over the desired spectrum with the plurality of local oscillator signals.

\* \* \* \* \*